April 19, 1927. 1,625,760
C. ALTWICKLER
ALTERNATING CURRENT MOTOR
Filed Oct. 15, 1923
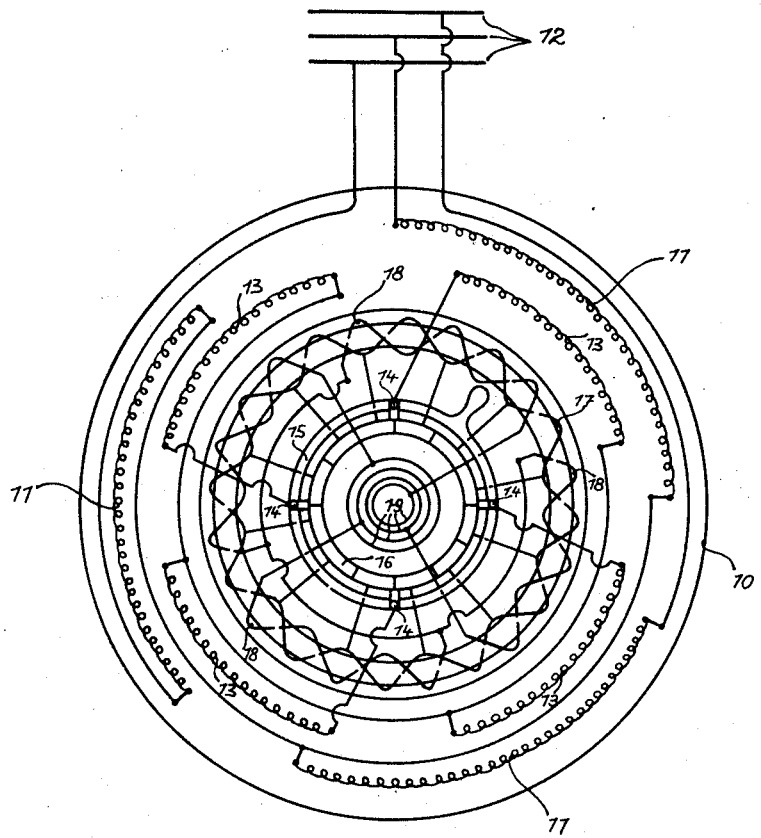
WITNESSES:
Betty McWhirter
Edward Mraus
INVENTOR:
Carl Altwickler
By Chatwin Company
Attys.

Patented Apr. 19, 1927.

1,625,760

UNITED STATES PATENT OFFICE.

CARL ALTWICKLER, OF GOTHA, GERMANY, ASSIGNOR TO DEUTSCHE WERKE AKTIEN-GESELLSCHAFT, OF BERLIN-WILMERSDORF, GERMANY, A CORPORATION OF GERMANY.

ALTERNATING-CURRENT MOTOR.

Application filed October 15, 1923, Serial No. 668,761, and in Germany June 27, 1922.

This invention relates to an alternating current motor and more especially to a type of compensated induction-motor for single-phase or polyphase current, in which the current for exciting the field instead of being supplied to the stator or primary member is introduced into the rotary part by means of a commutator, and in which two distinct windings are provided on the rotary part, viz, one winding connected to the commutator for supplying essentially the exciting current, and a further closed winding destined to act as the secondary of an induction or a synchronous motor for carrying essentially the working current, that is the current which causes the mechanical torque of the motor.

One object of my invention consists therein, that I arrange the commutator winding or the secondary or phase winding or both with a greater number of phase than three, either for the purpose of reducing the space which is required for the windings or for the purpose of reducing the current-losses in the same.

Another object of my invention is to arrange said windings on the rotary part of a compensated induction motor in such a manner that the commutator or exciter winding will carry in addition to the exciting current also a part of the working current for the purpose of increasing the efficiency of the motor or even obtain a maximum efficiency therein.

A further object of my invention is to provide an arrangement for obtaining the proper number of phases for supplying the commutator or exciter-winding from the alternating current mains, by means of a phase transformer which is mounted within the stator and united with the stator-winding of the motor.

My invention is based on careful theoretical investigations and is in general designed to meet the requirements regarding the power factor of alternating current networks by providing an efficient compensated single-phase or polyphase motor, which will not form an inductive load by drawing lagging current from the mains of the supply circuit and therefore exert an injurious effect on the power factor of the line.

In the accompanying drawing I have shown diagrammatically a motor according to my invention. The stator 10 of the motor carries a winding 11, which may be called the primary stator-winding; this winding, which is shown as three-phase star-connected winding, is connected to the three-phase alternating-current supply circuit 12. A further winding 13, which may be called the secondary stator-winding, is also mounted on the stator and in inductive relation to the primary winding 11. This secondary winding 13 is arranged as four-phase star-connected winding and the four terminals are connected to a set of brushes 14, which are shown as being mounted on a shiftable brush-holder 15, supplying four-phase alternating current to the commutator 16, connected to the exciter-winding 17 mounted on the rotor-body of the motor. A further phase-winding 18 is mounted together with said exciter-winding 17 on the rotor, said phase-winding being shown as four-phase star-connected winding with its terminals connected to the slip-rings 19 which are short-circuited during the action of the motor.

When designing a compensated induction motor with a secondary winding in addition to the exciter-winding on the rotor, there is some difficulty in providing the necessary space required by the two windings. While in a normal induction motor the ampere-turns required for the excitation of the motor are mounted on the stator and therefore the entire cross-section of the copper in the stator must be larger than that in the rotor, in a compensated induction motor the opposite will be the case. In a motor of the latter kind there must be provided a further cross-section for the exciting current in addition to that necessary for the working current. This increase of the cross-sectional space will be considerable, especially if two distinct windings are provided on the rotor-body.

According to my invention I have found a novel way which will enable one to employ two windings for the above-mentioned purposes on the rotor-body and yet reduce the space required for these windings or the current densities and the current losses in the rotor. A new feature of my invention consists therein that I reduce the number of ampere-turns to be employed in the rotor by increasing the number of phases of one or both of the rotor-windings. Taking a three-phase commutator-winding, the conductors forming one phase of the winding are distributed over an arch of 120 electrical degrees and the effective geometric sum of the ampere-turns is therefore equal to 0.83 of the value resulting from the arithmetic sum of the ampere-turns. By increasing the number of phases this coefficient will also be increased. In a six-phase arrangement of the winding this coefficient for instance will have a value of 0.955. In such case therefore the copper cross-section of the winding may be reduced in the ratio 0.83/0.955, if the same current density is retained, or if the copper cross-section be retained, the current density may be reduced in the same ratio and in consequence thereof reduce the current losses according to the square of this ratio.

Like considerations have led me to the employment of more phases in the phase-winding, which serves essentially for carrying the working current. In this winding likewise an increase of the number of phases will have the result, that either the space required for the winding or the losses in the latter will be reduced. The increase of the number of phases, that is of the number of short-circuit connections in the winding for the working current has still a further valuable advantage, viz, an improved commutation in the exciter-winding. This is due to the fact that the closed circuits formed by the short-circuit connections will exert a damping action upon the parts of the commutator winding, which are momentarily closed when commutating and consequently improve the commutation of the motor. By increasing the number of phases of the phase-winding furthermore the several short-circuited parts of the latter will extend over a smaller part of the circumference of the armature and in consequence thereof exert a better damping action upon the circuits of the commutator winding which are momentarily closed under the brushes.

In order to further improve the qualities of the motor according to my invention, especially with regard to efficiency, I propose to properly design and arrange the commutator or exciter-winding in such a manner that it will carry a part of the working current of the motor in addition to the exciter-current proper, for which it is destined in compensated motors of the ordinary type heretofore constructed or proposed.

Let $i_t$ designate the current necessary for the formation of the magnetic field, $i_m$ the working current required for producing the mechanical torque in the motor, $r_k$ the resistance of the short-circuited winding for the working current, and $r_e$ the resistance of the exciter-winding. The entire current loss in the armature of the motor, in case the exciter-winding be carrying only $i_t$ amperes and the winding for the working current $i_m$ amperes will have a value $V_1$ according to the equation:

$$V_1 = i_m^2 \cdot r_k + i_t^2 \cdot r_e.$$

If now a part of the working current $i_m$ is imposed upon the exciter-winding, for instance a part $a x i_m$ and a current $(l-a) x i_m$ is retained in the winding for the working current, there will be losses $V_2$ according to the equation:

$$V_2 = i_t^2 \cdot r_e + r_e \cdot i_m^2 a^2 + r_k \cdot i_m^2 (l-a)^2 = i_t^2 \cdot r_e + i_m^2 (r_e \cdot a^2 + r_k (l-a)^2)$$

The term in brackets according to the equation will become a minimum, if $$a \cdot r_e = (l-a) r_k$$

that is if $$\frac{r}{r_k} = \frac{l-a}{a},$$

or if $$a = \frac{r_k}{r_e + r_k}.$$

In this case $V_2$ will be expressed by the equation:

$$V_2 = i_t^2 r_e + i_m^2 \frac{r_e \cdot r_k}{r_e + r_k}$$

and the current, which must be carried over the commutator will be $$\sqrt{i_t^2 + a^2 i_m^2}$$

If this value should become undesirably large it is advantageous to impose a somewhat smaller amount of working current upon the exciter-winding, as would correspond to the most favorable value, because the losses will only little change in proximity to the most favorable condition, while the electrical stress upon the commutator will eventually decrease to a considerable extent.

The amounts of the working current, which according to my invention are imposed upon the phase-winding or working-current winding and the commutator or exciter-winding in proper distribution can be chosen as desired, for instance by adjusting magnitude and phase of the voltage impressed upon the commutator, which may be attained by adjusting the brushes by means of the shiftable brush-holder shown in the drawing. The cross-section of the exciter-winding must of course be properly dimensioned in order to be able to carry the desired part of the working current.

Having thus described my invention, I wish to be understood, that I do not desire to limit my invention to the exact construc- tions described in the specification and represented in the drawing, since many modifications may be made thereon without departing from the spirit of my invention or sacrificing any of its advantages, especially with regard to the above-pointed out features of saving in space for the rotor-winding or in reducing the rotor losses or in otherwise improving the electrical qualities or increasing the efficiency of the motor.

I therefore aim to cover all such modifications of and departures from the constructions as described and shown herein by the following claim:

In a compensated induction motor, the combination of a rotor and a stator, a three phase primary winding on the stator, a secondary stator winding of a greater number of phases than three arranged in inductive relation to the primary winding of the stator and serving for the excitation of the motor, a commutator, a set of brushes sliding on the commutator conforming in number to the phases of the secondary stator winding, connections between the phases of the secondary stator windings and said brushes respectively, an exciting and compensating rotor winding which is connected to the commutator and receives current from the secondary stator winding in which latter electromotive force is generated of such magnitude or phase that the current passing between the secondary stator winding and the commutator winding will excite the rotary field of the motor.

In testimony whereof I have affixed my signature.

CARL ALTWICKLER.

Certificate of Correction.

Patent No. 1,625,760.                     Granted April 19, 1927, to

CARL ALTWICKLER.

It is hereby certified that error appears in the printed specification of the above-numbered patent requiring correction as follows: Page 2, line 76, and between lines 80 to 90, for "*l*" read *1;* and that the said Letters Patent should be read with these corrections therein that the same may conform to the record of the case in the Patent Office.

Signed and sealed this 1st day of November, A. D. 1927.

[SEAL.]
                                                                   M. J. MOORE,

*Acting Commissioner of Patents.*